United States Patent [19]

Brown

[11] 4,179,861
[45] Dec. 25, 1979

[54] METHOD OF ANCHORING A BOREHOLE ANCHOR

[75] Inventor: John V. Brown, Aylesbury, England

[73] Assignee: Fosroc A.G., Switzerland

[21] Appl. No.: 932,980

[22] Filed: Aug. 11, 1978

[30] Foreign Application Priority Data

Aug. 12, 1977 [GB] United Kingdom ............ 33866/77

[51] Int. Cl.² ............................................. E04B 1/00
[52] U.S. Cl. ...................................... 52/743; 405/261
[58] Field of Search ................. 52/743, 742; 405/261, 405/260, 259

[56] References Cited

U.S. PATENT DOCUMENTS

| | | | |
|---|---|---|---|
| 3,283,513 | 11/1966 | Kierans et al. | 405/260 |
| 3,430,449 | 3/1969 | Novotny et al. | 405/261 |
| 3,892,101 | 7/1975 | Gruber | 405/261 |
| 3,973,409 | 8/1976 | Asayama | 405/260 |
| 4,124,983 | 11/1978 | Weatherby | 405/260 |

FOREIGN PATENT DOCUMENTS 1170610 11/1969 United Kingdom .
1266152 3/1972 United Kingdom .

*Primary Examiner*—Carl D. Friedman
*Attorney, Agent, or Firm*—Caesar, Rivise, Bernstein & Cohen, Ltd.

[57] ABSTRACT

A method of anchoring an anchor element in a borehole comprises supplying self-setting composition into a sleeve while withdrawing the sleeve so that the self-setting composition fills the annular clearance between the element and the wall of the hole. Preferably the element is first secured within the hole by a self-setting resinous composition and, in order to provide additional corrosion protection for the element, the end portion of the element has a precast sleeve, and a plastics sheath is heat-shrunk on to the remaining portion of the element.

7 Claims, 1 Drawing Figure

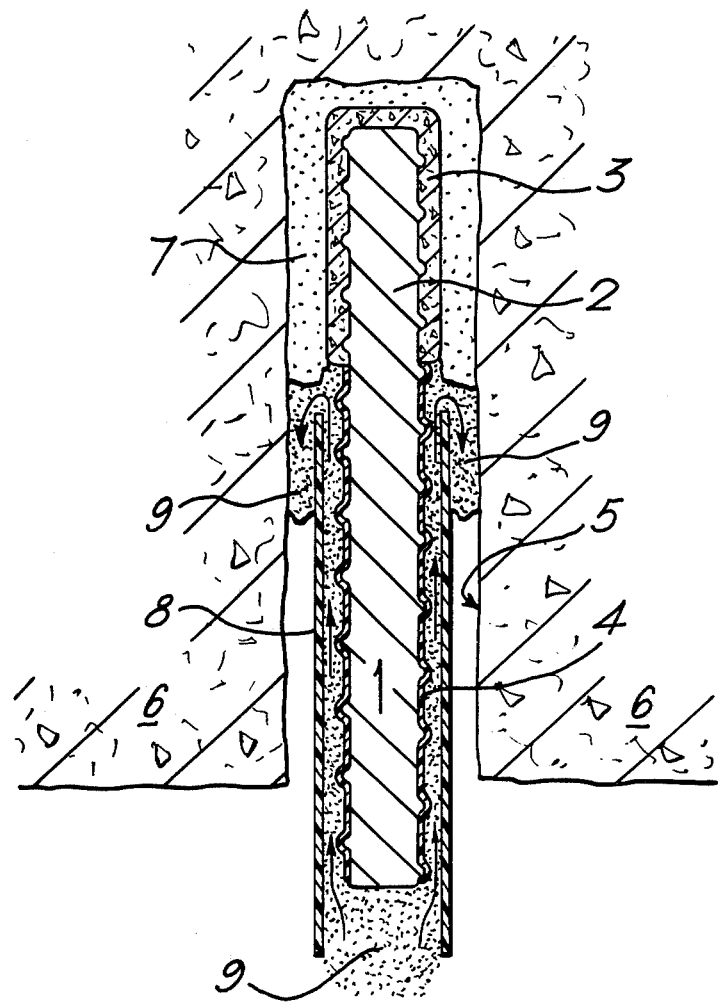

METHOD OF ANCHORING A BOREHOLE ANCHOR

The invention relates to anchoring and particularly to the anchoring of an anchor element in a hole in a substrate. The anchor element may be a length of wire or strand or reinforcing bar, of any shape or size but for brevity the invention will be illustrated herein with reference to reinforcing bars.

In many applications in building, construction or in mining, it is necessary to secure an anchor element in a blindended hole in a substrate either to secure objects to the substrate or to hold the substrate together. It is known to secure the anchor element within the hole by means of a self-setting composition located in the annular clearance between the element and the wall of the hole and it is important that the composition should completely fill the annular clearance with little or no voids in the composition.

According to the invention a method of anchoring an anchor element in a hole in a substrate, the element having a corrosion resistant sheath over at least part of its length, which sheath is liable to be damaged by the rough nature of the wall of the hole, which method comprises placing an end portion of the anchor element in the hole, locating about the corrosion resistant sheathed portion of the element a sleeve dimensioned to form an annular clearance between the element and the inner surface of the sleeve, securing the element in the hole and then supplying self-setting composition into the sleeve while withdrawing the sleeve from the hole so as to fill the annular clearance between the element and the wall of the hole with self-setting composition.

Preferably the anchor element is secured within the hole using a relatively quick self-setting composition, preferably resinous, in a cartridge containing the interactive components of the resinous self-setting composition, such as that described in out British Patent Specification No. 1,384,364, using the techniques there described. In one such technique, the element is rotated, and the presence of the sleeve tends to shield the corrosion resistant sheath from damage.

Most preferably a precast sleeve is present about the end portion of the element to be placed adjacent the blind end of the hole; the precast sleeve may be formed of a self-setting composition of a resinous or cementitious nature or of a plastics material. British Patent Specification No. 1,382,054 describes forms of precast sleeve which are suitable for use in the present invention.

The corrosion resistant sheath is preferably applied to the remaining portion of the element within the hole to provide added protection against corrosion of this portion of the element. The sheath may be in the form of a plastics film or, more preferably, is a plastics sheath which is heat-shrunk onto the respective portion of the element.

In a preferred feature of the invention there can be a relatively large difference in diameter between the anchor element and the hole, and yet there is no need accurately to relate the diameter of the various parts of the element to the hole diameter. Thus the element may be of relatively small diameter and have a corrosion resistant sheath which, by virtue of the use of the sleeve, is not damaged, and the gap may then be filled with a self-setting composition. The sleeve is preferably formed of a plastics material and preferably has relatively smooth inner and outer surfaces.

The invention is illustrated by way of example with reference to the accompanying diagrammatic drawing showing a longitudinal sectional view of an anchor element secured in a hole by the method of the invention.

The anchor element shown in the drawing is a length of 27 mm diameter concrete reinforcing bar 1, an end portion 2 of which is set in a precast concrete sleeve 3. A sheath 4 of plastics material is heat-shrunk onto the remaining length of the bar 1. The element is in a borehole 5 of about 50 mm diameter is a substrate 6, leaving an annular clearance of about 23 mm between the bar and the hole wall.

A cartridge containing the interactive components of a self-setting resinous composition, not shown, is inserted into the borehole and the bar 1 carrying the precast sleeve 3 and the sheath 4 is urged into the borehole with the end portion 2 leading. A smooth-walled sleeve 8 of plastics material is slipped over the sheathed length of the bar until it is adjacent the precast sleeve 3. The bar 1 is rotated to rupture the cartridge and release and intermix the interactive resinous components to form a body of set material 7 which holds the bar within the hole. The sleeve 8 protects the primary corrosion sheath 4 from being damaged while the bar is rotated. A self-setting grout 9 is pumped up the sleeve 8 until the grout overflows the upper end of the sleeve 8. The sleeve 8 is gradually withdrawn from the hole while pumping of the grout 9 continues thus directing the grout to fill the annular clearance between the sheath 4 and the facing wall of the hole 5.

In addition to serving as a protection of the sheath 4, the sleeve 8 which is withdrawn during introduction of grout into the borehole provides improved control over the introduction of the grout which allows the annulus between the element and the wall of the hole to be completely filled with the grout. The use of expensive and complicated equipment, which would otherwise be required to introduce the grout, is avoided.

It is possible to use any grout as the element may be stressed after the resinous self-setting composition has set about the end portion of the element to secure the element in place, say two hours, and before the grout has set. The grout may be a cementitious grout incorporating set retarders.

Without further elaboration the foregoing will so fully illustrate my invention that others may, by applying current or future knowledge, readily adapt the same for use under various conditions of service.

What is claimed as the invention is:

1. A method of anchoring an anchor element in a hole in a substrate, which comprise placing an end portion of the anchor element in the hole, locating about the element a sleeve dimensioned to leave an annular clearance between the element and the inner surface of the sleeve, securing the element in the hole and then supplying self-setting composition into the sleeve while withdrawing the sleeve from the hole so as to fill the annular clearance between the element and the wall of the hole with self-setting composition.

2. A method according to claim 1, in which the anchor element is first secured within the hole using a relatively quick self-setting composition in a cartridge and the element is rotated within the hole to rupture the cartridge.

3. A method according to claim 1, in which a precast sleeve is located about the end portion of the element adjacent the blind end of the hole.

4. A method according to claim 1 wherein the element has a corrosion resistant sheath or at least part of its length, which sheath is liable to be damaged by the rough nature of the wall of the hole.

5. A method according to claim 4, in which the corrosion resistant sheath is heat-shrunk on to at least a portion of the element.

6. A method according to claim 4, in which the corrosion resistant sheath is a plastic film.

7. A method according to claim 1, in which the sleeve withdrawn from the hole during introduction of the self-setting composition is formed of a plastic material and has relatively smooth inner and outer surfaces.

* * * * *